United States Patent [19]

Becker et al.

[11] Patent Number: 5,305,401
[45] Date of Patent: Apr. 19, 1994

[54] OPTICAL CONNECTION DEVICE AND DATA PROCESSING APPARATUS FITTED WITH OPTICAL TRANSMISSION MEANS

[75] Inventors: Alain Becker, Montrouge; Jean Chazelas, Paris, both of France

[73] Assignee: Thomson-CSF, Puteaux, France

[21] Appl. No.: 920,577

[22] PCT Filed: Dec. 13, 1991

[86] PCT No.: PCT/FR91/01009

§ 371 Date: Aug. 21, 1992

§ 102(e) Date: Aug. 21, 1992

[87] PCT Pub. No.: WO92/11553

PCT Pub. Date: Jul. 9, 1992

[30] Foreign Application Priority Data

Dec. 21, 1990 [FR] France ............... 90 16128

[51] Int. Cl.⁵ .............................. G02B 6/26
[52] U.S. Cl. ........................... 385/24; 385/44; 385/50; 385/146
[58] Field of Search ............ 385/13, 39, 18, 19, 385/24, 25, 44, 45, 43, 47, 50, 136, 146, 48; 250/227.14, 227.16

[56] References Cited

U.S. PATENT DOCUMENTS

| | | | |
|---|---|---|---|
| 4,169,001 | 9/1979 | Kaiser | 156/89 |
| 4,294,513 | 10/1981 | Nelson et al. | 385/13 X |
| 4,675,521 | 6/1987 | Sugimoto | 385/13 X |
| 4,830,461 | 5/1989 | Ishiharada et al. | 385/13 |

FOREIGN PATENT DOCUMENTS

| | | |
|---|---|---|
| 0116481 | 8/1984 | European Pat. Off. . |
| 0234981 | 9/1987 | European Pat. Off. . |
| 0360304 | 3/1990 | European Pat. Off. . |
| 90/01176 | 2/1990 | World Int. Prop. O. . |
| 90/02349 | 3/1990 | World Int. Prop. O. . |
| 90/04835 | 5/1990 | World Int. Prop. O. . |

*Primary Examiner*—Rodney B. Bovernick
*Assistant Examiner*—John Ngo
*Attorney, Agent, or Firm*—Pollock, VandeSande & Priddy

[57] ABSTRACT

An optical connection device includes at least one first rigid element fitted with an end which is preferably pointed; and at least one second element comprising a part made of elastic material such as silicon. Fasteners hold the end of the said first element against the elastic material of the said second element.

13 Claims, 2 Drawing Sheets

OPTICAL CONNECTION DEVICE AND DATA PROCESSING APPARATUS FITTED WITH OPTICAL TRANSMISSION MEANS

RELATED CO-PENDING APPLICATIONS

The following co-pending applications are related to the present invention:
U.S. Ser. No. 639,894, filed Jan. 11, 1991 - GAU 2612 358/483
U.S. Ser. No. 648,906, filed Jan. 31, 1991. - GAU 2504 250/208.1

FIELD OF THE INVENTION

The invention relates to an optical connection device for transmission of light information; it also relates, by way of application, to a data processing apparatus fitted with optical transmission means employing such a connection principle.

BACKGROUND OF THE INVENTION

In the data processing installations where the information is processed en masse in parallel, it is more and more necessary to have available transmission lines called "buses", of high performance, capable of transmitting several Gbits/s.

Only optical technology today is capable of providing throughputs greater than a Gbits/s, simultaneously over a large number of links, with interfaces of small dimensions and low consumption.

The European Patent Document 0 196 933 describes a system making it possible to establish optical links between circuits of the same apparatus. It necessitates a transparent sheet forming the rear panel of the housing, light sources and receivers carried by the printed circuits and situated, preferably, in immediate proximity to the said rear panel. The diffracting optical elements and reflector elements are judiciously placed on the rear panel in order to transmit the light between one or more emitters and one or more receivers by creating multiple reflections in the transparent sheet. This principle implies a certain optical route "in air" outside any light guide of the fibre optic type.

Moreover, it is relatively constricting as far as the installation of the components on the printed circuits and the positioning of the latter are concerned.

BRIEF DESCRIPTION OF THE INVENTION

The invention envisages a different concept in which every optical route is completely defined by light guides, with high-performance optical connections between them, giving rise to a minimum loss.

One aim of the invention is to propose a novel, simple, high-performance optical connection device, which is economical as much from the point of view of the installation cost as from the point of view of the running cost.

To this end, the invention relates to an optical connection device for transmission of light information, comprising at least one first rigid transparent element with a pointed end, at least one second element made at least partly of transparent elastic material, and mechanical fixing means for forcibly applying and holding the pointed end of the said first element against the part made of transparent elastic material of the said second element.

All of these elements are preferably made of glass or of transparent plastic material as far as the rigid parts are concerned; the elastic material mentioned above is a material adapted to the transmission of optical signals, based on silicon or on deformable plastic such as a thermoplastic of the hot-or cold-vulcanising silicone elastomer type, used especially for contact lenses.

Another aim of the invention is to apply the connection principle defined above in the architectures of data processing apparatuses (signal, information or images) comprising optical transmission means with high throughputs, for example of the order of several Gbits/s.

Another aim of the invention is to provide high-performance optical links, possibly disconnectable, between the components of a single circuit and/or components of neighboring circuits.

More precisely, the invention relates to a data processing apparatus with optical transmission means for transmission of light information, comprising at least one first light guide with a pointed end made of rigid material, at least one second light guide fitted with at least one segment of transparent elastic material, and mechanical fixing means for forcibly applying and holding the said end against a side of the said segment made of transparent elastic material.

The pointed end of the said first light guide will preferably be in the shape of a cone if the guide has a cylindrical cross-section or in the shape of a dihedron if the guide has a square or rectangular cross-section. The latter characteristic will enable the direction of the light route to be changed by covering one face of this dihedron with a reflecting or semi-reflecting coating.

Advantageously, the dihedron of the pointed end of the first light guide comprises two oblique facets delimiting a laterally offset ridge, one of the facets coming into the extension of the first light guide and the other forming a swelling on the side of the first light guide terminating in an inclined shoulder.

The invention will be better understood and other advantages of it will appear more clearly in the light of the description which follows, given solely by way of example and by reference to the attached drawings, in which:

DETAILED DESCRIPTION OF THE INVENTION

Figure 1:
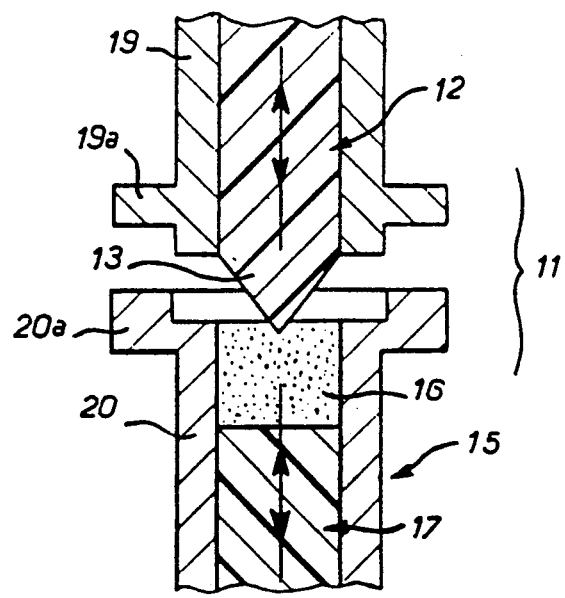
FIG. 1 is a diagrammatic view of an optical connection device in accordance with the invention.

Referring more particularly to FIG. 1, a simple optical connection device 11 is represented, for transmission of light information, which can be incorporated into any data processing or transmission system comprising at least one optical transmission line with a high information throughput. The connection device thus permits any two units, not represented, of such a system to be connected. Here, it comprises a first rigid element 12, made of transparent plastic material or of glass, of circular, square or rectangular cross-section, whose free end 13 is pointed, for example a cone or a dihedron according to the shape of the cross-section of the rigid element 12. The shape of the latter, in cross-section, can be different from that of those which are indicated above.

The device further comprises a second transparent element 15, at least partly elastic. More precisely, in the example represented, the second element 15 is composed of another rigid element 17 of the same type as the element 12 and of a pellet 16 made of transparent elastic material, situated at its connecting end. The pellet 16 is in contact with the rigid element 17. The first rigid element is contained in an opaque sheath 19 except for its pointed end 13 which projects beyond the end of this sheath. The pellet 16 and the element 17 are housed end-to-end in an opaque sheath 20, the pellet being flush with the bottom of a shallow recess formed at the end of the sheath 20, shaped and dimensioned in order to receive the corresponding end of the sheath 19. This arrangement thus ensures correct positioning of the optical transmission elements. The device described above is finished off by mechanical fixing means for forcibly applying and holding the end 13 of the first element 12 against the pellet 16 made of transparent elastic material. In this example, these mechanical fixing means are embodied by flanges 19a, 20a, defined at the respective ends of the sheaths 19, 20 and intended to be assembled one against the other by any suitable means, not represented. It emerges clearly from the drawing that, when the flanges are thus assembled, the pointed end 13 penetrates into the pellet 16. The refractive indices of the various materials are chosen in order to ensure light transmission without further deviations. The pellet 16 is made of a material based on silicon, on deformable plastic, or on any other transparent elastic material with appropriate optical properties. It is, for example, a thermoplastic of the hot- or cold-vulcanizing silicon elastomer type such as those used for contact lenses. The deformation by compression exerted on this pellet 16 by the rigid pointed end 83 has the effect of generating a reactive force optimising the contact with this pointed end 13. All of these elements, once assembled, reconstitute a light guide capable of transmitting information at a very high throughput, of the order of several Gbits/s.

In the following examples, the connection devices are exploited in order to implement a change of orientation in the optical route of the light information. In order to do this, the rigid element has a square or rectangular cross-section and its free end is in the shape of a dihedron. Moreover, at least one of the faces of this dihedron is covered by a reflecting or semi-reflecting coating.

Figure 2:
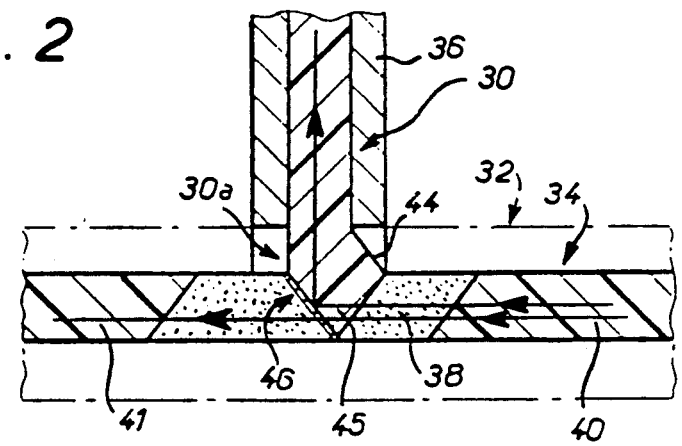
FIG. 2 is a digrammatic, sectional view of a part of a data processing apparatus equipped with means of transmission of light information fitted with connections in accordance with the principle of the invention.

More precisely, with reference to FIG. 2, any part of data processing apparatus is represented, especially a first light guide 30 connected to a multi-layer printed circuit 32 which comprises, buried between the layers, a second light guide 34. As the light guide 30 is arranged perpendicular to the plane of the printed circuit, the two light guides 30, 34 are mutually perpendicular. They have a square or rectangular cross-section. With the exception of its end portion 30a, the guide 30 is mounted inside an opaque sheath 36, which is not necessary for the guide 34 which is buried in the printed circuit. The latter comprises a segment made of transparent elastic material 38 assembled with at least one rigid segment, the mounting being carried out with slight compression of the said segment made of transparent elastic material. In the example represented, the segment 38 is interposed between two rigid segments 40, 41. The connecting faces of these segments are preferably inclined with respect to the axis of the guide, as represented.

The first light guide 30 has a rigid pointed end 30a which penetrates into the circuit 32 and which is forcibly applied and held in the segment made of transparent elastic material 38 of the second light guide 34. This rigid pointed end 30a forms a dihedron 45 with a ridge which is perpendicular to the second light guide 34, laterally offset in the extension of one of the lateral walls of the first light guide 30 and delimited by two oblique, symmetric facets. One of these oblique, symmetric facets comes into the alignment of the main section of the first light guide 30 while the other delimits a lateral swelling on the end of the first light guide 30, terminating in an inclined shoulder 44.

The inclined shoulder 44 which terminates the lateral swelling of the end 30a of the first light guide 30 comes into contact with a corresponding bearing face of the opaque sheath 36. This makes it possible to carry through the repulsion force, exerted by the transparent elastic material 38 on the rigid pointed end 30a, to the end of the opaque sheath which is equipped with a flange similar to the flange 19a of FIG. 1, permitting it to be fixed by screws to the printed circuit 32.

The oblique facet which comes into the alignment of the main section of the first light guide 30 carries a reflecting or semi-reflecting coating 46 and enables, by reflection and change of direction, the light beam to be passed from the first light guide 30 to the second 34 or conversely, while the laterally offset oblique facet on the end of the first light guide reduces parasitic reflections by sending them onto the edges of the transparent elastic material and not into its axis.

Figure 3:
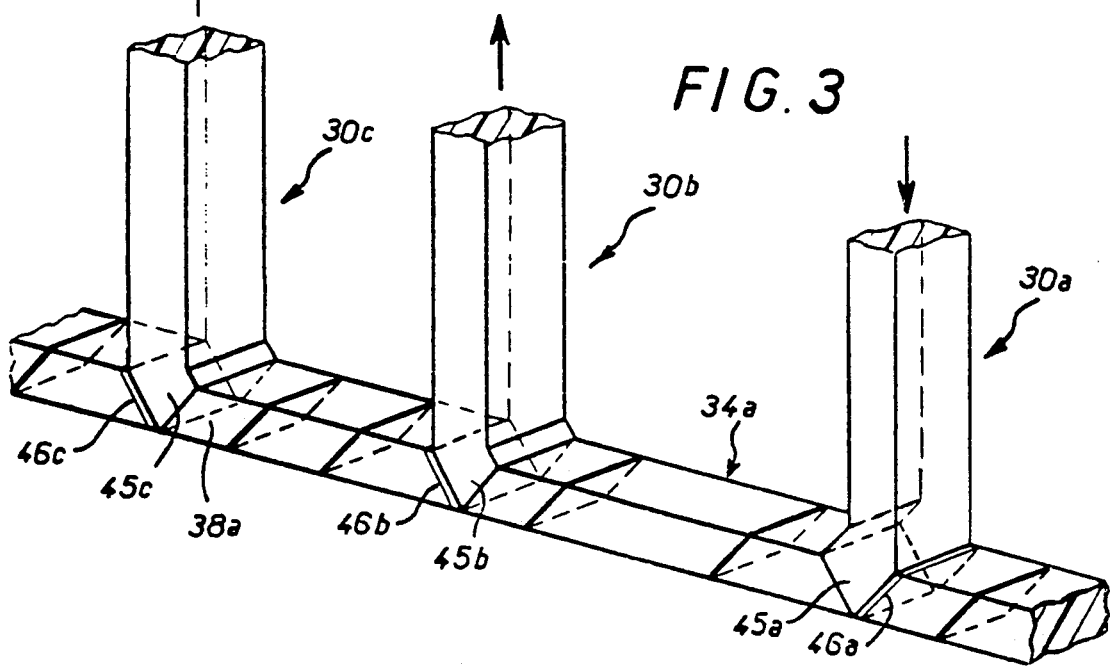
FIG. 3 is a diagrammatic, perspective view of another part of such a data processing apparatus.

If the coating 46 is completely reflecting, virtually the whole of the light beam passes from the guide 30 into the guide 34 or vice-versa. If the coating is semi-reflecting, the beam can be "shared" among several guides. By way of non-limiting example, FIG. 3 shows a link arrangement between an "emitter" guide 30a linked to a source of light information and two "receiver" guides 30b, 30c linked to various receivers. These three guides, whose ends are in rigid dihedron shapes, are connected to the same guide 34a (for example buried in a multi-layer printed circuit), the dihedron of each guide 30 being engaged in a segment of transparent elastic material 38a, for example based on silicon or on deformable plastic such as a thermoplastic of the silicon elastomer type used especially for contact lenses. The dihedron 45a of the emitter guide 30a comprises a face having a coating 46a, here completely reflecting, which reflects the light towards the other two dihedrons. The dihedron 45b of the receiver guide 30b, which is closest, comprises a face having a semi-reflecting coating 46b in such a way that part of the light beam reaches the other dihedron 45c of the receiver guide 30c. This dihedron has, on one of its faces, a coating 46c, which can be completely reflecting or, on the contrary, semi-reflecting if other receivers are coupled to the guide 34a.

Figure 4:
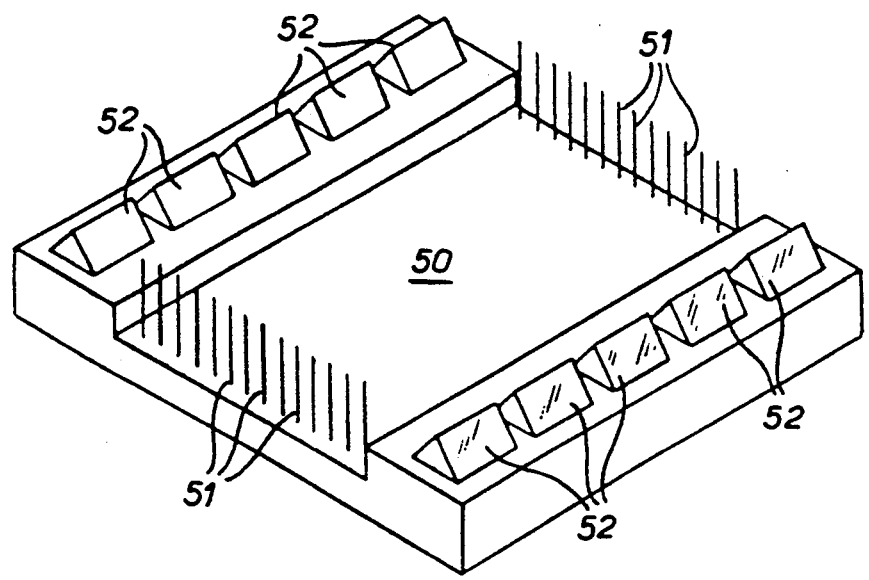
FIG. 4 diagrammatically illustrates, in perspective, a sub-assembly of such an apparatus.

FIG. 4 illustrates a hybrid sub-assembly 50 capable of constituting part of a data processing 35 apparatus in accordance with the invention. Such a sub-assembly can group together electronic processing circuits, processors and memories, etc., accessible via rows of electrical contacts 51. According to the invention, it also comprises first and/or second light guides in accordance with the description above, which are here advantageously arranged in such a way as to form at least one row of optical contacts 52 for linking with other sub-assemblies. In the example represented, the sub-assembly 50 comprises two rows of optical contacts, these being constituted by dihedron ends, of the type described above.

Figure 5:
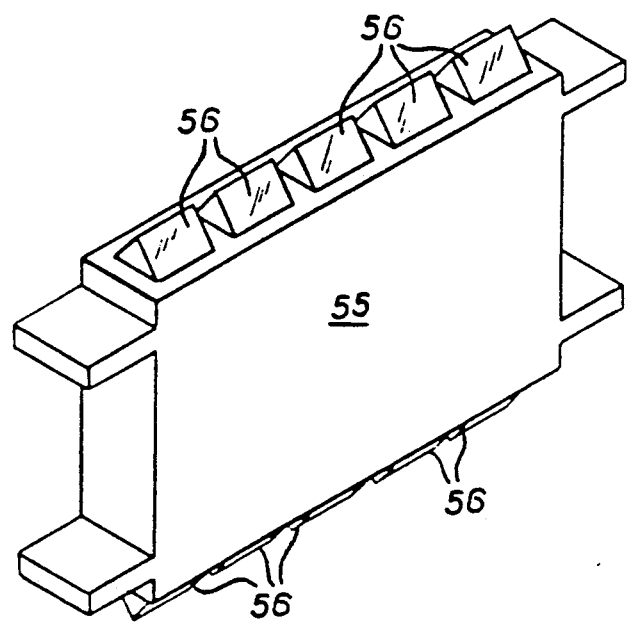
FIG. 5 diagrammatically illustrates, in perspective, a link module intended to be interposed between two circuits of such an apparatus.

FIG. 5 represents another component in accordance with the principle of the invention. It concerns a linking module 55 intended to be mounted between neighboring circuits or sub-assemblies. In the example, this module comprises a plurality of first and/or second light guides arranged, preferably, mutually parallel. These guides are trapped in an over-molded block with the exception of their ends 56, here in the shape of a dihedron.

The type of optical connection, which has just been described, by reversible deformation of a transparent elastic material by means of a pointed rigid optical element exhibits the advantage of being disconnectable and of being able to replace the pointed rigid optical element in order to modify, possibly, the coupling characteristics thereof (bevelled shape or reflective index of the end) or to carry out maintenance thereon. The recommended shape makes it possible to adapt the coupling in an optimum manner between the two optical elements while preserving an effective cross-section equal to the cross-section of the bar.

We claim:

1. Data processing apparatus having optical transmission means for transmission of light information, comprising at least one first light guide with a pointed end made of rigid material; at least one second light guide fitted with at least one segment of transparent elastic material; and mechanical fixing means for forcibly applying and holding the said pointed end against a side of the said segment made of transparent elastic material.

2. Data processing apparatus according to claim 1, wherein at least one of the above-mentioned light guides is embedded in a structure of a multi-layer printed circuit.

3. Data processing apparatus according to claim 1 wherein the second light guide comprises a segment made of transparent elastic material assembled with at least one rigid segment; the transparent elastic material being compressed by the pointed end.

4. Data processing apparatus according to claim 1 wherein the guides have a parallelepiped cross-section, the pointed end, made of rigid material, being in the shape of a dihedron with at least one face covered by at least a semi-reflecting coating.

5. Data processing apparatus according to claim 4, wherein the pointed rigid end, in the shape of a dihedron, exhibits a ridge which is delimited by two oblique facets, the ridge being offset laterally with respect to a main axis of the first light guide, one of the facets intersecting a surface of the first light guide, the other facet projecting to an intermediate inclined shoulder which intersects another surface of the guide to form a projection.

6. Data processing apparatus according to claim 5 wherein the first light guide is clad with an opaque sheath provided at its end with the said mechanical fixing means; and with a bearing surface contacting the inclined shoulder in order to transfer, via the opaque sheath and thus to the said mechanical fixing means, a repulsion force exerted on the pointed end of the first light guide by the said elastic segment.

7. Data processing apparatus according to one of claims 1 to 6, together with at least one hybrid sub-assembly including at least the first light guide arranged in at least one row of optical contact elements for linking with other sub-assemblies.

8. Data processing apparatus according to one of claims 1 to 6, together with at least one link module between adjacent first light guides arranged mutually parallel to one another.

9. An optical connector for light information transmission, the connector comprising:
at least a first light guide having a rigid transparent element terminating in a pointed end;
at least one second light guide coupled to the first and including a member of transparent elastic material; and
fastening means for urging the pointed end of the first light guide into continuous compressive contact with the elastic member for ensuring an uninterrupted light path between the guides.

10. The connector set forth in claim 9 wherein the transparent elastic material is a thermoplastic of the silicon elastomer type.

11. The connector set forth in claim 9 wherein the rigid element has a parallelogram cross section, and the pointed end is formed as a dihedron, one surface of which has a coating thereon for at least partially reflecting light.

12. The connector set forth in claim 9 wherein intersecting surfaces of the dihedron pointed end form an end ridge which is laterally offset from a main axis of the rigid element;
one of the intersecting surfaces appending directly from a main portion of the rigid transparent element, another of the intersecting surfaces appending to an intermediate inclined shoulder which, in turn, appends to the main portion of the element thereby forming a side projection.

13. The connector set forth in claim 9 wherein the rigid transparent element is embraced by an opaque sheath having a section mounting the fastening means thereto;
the sheath further including a bearing surface contacting the inclined shoulder for facilitating transfer of bias force exerted on the pointed end, by the compressed elastic material, to the fastening means.

* * * * *